(12) United States Patent
Aoki et al.

(10) Patent No.: US 7,671,957 B2
(45) Date of Patent: Mar. 2, 2010

(54) DISPLAY DEVICE

(75) Inventors: Hironori Aoki, Tokyo (JP); Akio Nakayama, Tokyo (JP); Manabu Tanahara, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 198 days.

(21) Appl. No.: 11/766,494

(22) Filed: Jun. 21, 2007

(65) Prior Publication Data

US 2007/0296674 A1 Dec. 27, 2007

(30) Foreign Application Priority Data

Jun. 21, 2006 (JP) ............................. 2006-170916
May 11, 2007 (JP) ............................. 2007-126485

(51) Int. Cl.
*G02F 1/1333* (2006.01)

(52) U.S. Cl. ...................... 349/149; 349/152

(58) Field of Classification Search ................. None
See application file for complete search history.

(56) References Cited

U.S. PATENT DOCUMENTS

| 5,446,562 | A | * | 8/1995 | Sato ............................. 349/42 |
| 6,268,895 | B1 | * | 7/2001 | Shimada et al. ............. 349/110 |
| 6,580,486 | B1 | * | 6/2003 | Sekine ........................ 349/139 |
| 6,975,295 | B2 | | 12/2005 | Hashimoto et al. |
| 2005/0110924 | A1 | * | 5/2005 | Kim et al. .................... 349/111 |
| 2005/0253150 | A1 | | 11/2005 | Motoshima et al. |
| 2006/0215102 | A1 | * | 9/2006 | Otose et al. ................. 349/151 |
| 2007/0030409 | A1 | | 2/2007 | Aoki |
| 2008/0094562 | A1 | * | 4/2008 | Lee et al. .................... 349/153 |

FOREIGN PATENT DOCUMENTS

| CN | 1605902 A | 4/2005 |
| JP | 2000-29071 | 1/2000 |
| JP | 2001-183696 | 7/2001 |
| JP | 2002-99225 | 4/2002 |
| JP | 2005-266394 | 9/2005 |
| JP | 2005-352456 | 12/2005 |

OTHER PUBLICATIONS

U.S. Appl. No. 12/402,992, filed Mar. 12, 2009, Aoki.

* cited by examiner

*Primary Examiner*—Uyen-Chau N Le
*Assistant Examiner*—Mike Stahl
(74) *Attorney, Agent, or Firm*—Oblon, Spivak, McClelland, Maier & Neustadt, L.L.P.

(57) ABSTRACT

A TFT array substrate of a display device according to an embodiment of the present invention includes: a plurality of scanning signal lines formed in a display region; a plurality of display signal lines formed in the display region; a plurality of TFTs arraigned in matrix in the display region; a plurality of scanning lead-out lines arranged in a frame region formed outside the display region in accordance with the scanning signal lines; a gate insulating film formed on the plurality of scanning lead-out lines; and a first conductive layer formed on the gate insulating film and applied with a predetermined potential, the first conductive layer being formed to cover the plurality of scanning lead-out lines outside the sealing material.

12 Claims, 14 Drawing Sheets

DISPLAY DEVICE

BACKGROUND OF THE INVENTION

1. Field of the Invention

The present invention relates to a display device.

2. Description of Related Art

In general, liquid crystal display devices are structured such that a pair of upper and lower electrode substrates having a transparent electrode formed thereon is bonded with a sealing material applied to a periphery of an image display area on the substrates, and a liquid crystal is filled in the space created by the sealing material and the two substrates. Further, the liquid crystal display devices are classified into an active matrix type and a passive matrix type. The active matrix type liquid crystal display device includes a TFT array substrate having thin film transistors as switching elements arranged in matrix. Then, the TFT array substrate is bonded to the opposing substrate through the sealing material. A liquid crystal is filled in between the TFT array substrate and the opposing substrate.

In a display region of the TFT array substrate, scanning signal lines, display signal lines, and a pixel electrode are formed. The TFT as the switching element is turned ON/OFF in accordance with a scanning signal transmitted on the scanning signal lines. A display signal transmitted on the display signal lines is applied to the pixel electrode through the TFT. Then, if the display signal is applied to the pixel electrode, a display voltage corresponding to the display signal is applied between the opposing electrode and the pixel electrode to drive the liquid crystal.

The scanning signal transmitted on the scanning signal line and the display signal transmitted on the display signal line are supplied from a driving IC. Thus, in a frame region outside the display region, lead-out lines extend from the driving IC to the scanning signal line and to the display signal line. Further, in the frame region, the sealing material and a common line are formed. The common line transmits a common signal for applying a common potential.

Here, if the lead-out line faces opposing electrode across the sealing material or liquid crystal in the frame region, a display signal interferes with a common signal due to a parasitic capacitance thereof. Accordingly, a display quality is deteriorated due to a noise.

To overcome this defect, Japanese Unexamined Patent Application Publication No. 2001-183696 discloses a device where a conductive layer is formed over a lead-out line connected to a display signal line. Then, a ground potential is applied to the conductive layer to shield the display signal line from the opposing electrode to relax interference between signals. Hence, it is possible to prevent the display quality from deteriorating due to the interference between the display signal and a common signal.

Further, in a display device having lead-out lines formed on the right and left sides of the display region, a lead-out line length may locally vary due to a limitation on area of the used driving circuit or frame region. A difference in wiring load (resistance) corresponds to a difference in delay of the scanning signal. Further, a frame region of the display device has crossing points between the lead-out line of the scanning signal line and the lead-out line of the display signal line. The number and area of crossing points may locally vary. These lead to a difference in wiring load of the lead-out line of the scanning signal line, and a delay of the scanning signal varies. Variations of a pixel electrode potential due to the difference in delay look like unevenness of display image to a viewer, and the display quality drops.

Japanese Unexamined Patent Application Publication No. 2005-266394 discloses a countermeasure against the above. According to the technique of this publication, a conductive film is formed to overlap with a portion of the lead-out line of the scanning signal line formed in a frame region. Then, a capacitance is formed between the conductive film and the scanning signal line. Further, as for a lead-out line with a small wiring load outside the conductive film, an overlap between the line and the conductive film is increased. As a result, a wiring load difference between the lead-out lines is reduced to improve the display quality.

There is a space of only about 5 μm between an opposing substrate having an opposing electrode and a TFT array substrate in many cases. Further, an insulating film as a protective film is not generally formed on the opposing electrode. Therefore many corrosion reactions arose in the lead-out lines on the TFT array substrate occur in association with the opposing electrode. Further, the above defects do not occur just after production but mostly occur after a predetermined period. In particular, a display device in a cell phone used outdoors or a display device in an automobile are used under high temperature and high humidity conditions in many cases, so a corrosion reaction resulting from infiltrated water is promoted. Accordingly, in the above display devices, defects easily occur.

Further, the scanning signal line transmits a scanning signal for turning on/off the TFT on the TFT array substrate. Thus, a potential for turning the TFT off is almost always supplied to the scanning signal line. Hence, a potential difference of 10 V or higher occurs between the signal line potential and a common potential applied to the opposing electrode. On the other hand, the display signal line transmits a display signal corresponding to image data. Thus, an average potential of the display signal line is substantially equal to the common potential or different from the common potential by about several V. Accordingly, if the scanning signal line is compared with the display signal line, the scanning signal line has a large potential difference from the opposing electrode. Therefore, defects accompanying the corrosion reaction easily occur in the lead-out line of the scanning signal line. As described above, the display devices of the related art have a problem that a display quality is lowered due to corrosion of the lead-out line.

SUMMARY OF THE INVENTION

The present invention has been accomplished in view of the above problems and it is accordingly an object of the present invention to provide a display device of high reliability and high display quality.

A display device according to an aspect of the present invention includes: an array substrate including a pixel electrode; an opposing substrate provided opposite to the array substrate and including an opposing electrode; a sealing material applied around a display region and bonding the array substrate to the opposing substrate; and a display material filled in a space defined by the array substrate, the opposing substrate, and the sealing material, the array substrate being provided with: a plurality of scanning signal lines formed in the display region; a plurality of display signal lines formed in the display region to cross the plurality of scanning signal lines; a plurality of switching elements arranged in matrix in the display region and connected to the scanning signal lines and the display signal lines; a plurality of scanning lead-out lines arranged in a frame region formed outside the display region in accordance with the plurality of scanning signal lines; an insulating film formed on the plurality of scanning lead-out lines; and a conductive layer formed on the insulating film to cover the plurality of scanning lead-out lines outside the sealing material and applied with a predetermined potential.

According to the present invention, a display device of high reliability and high display quality can be provided.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
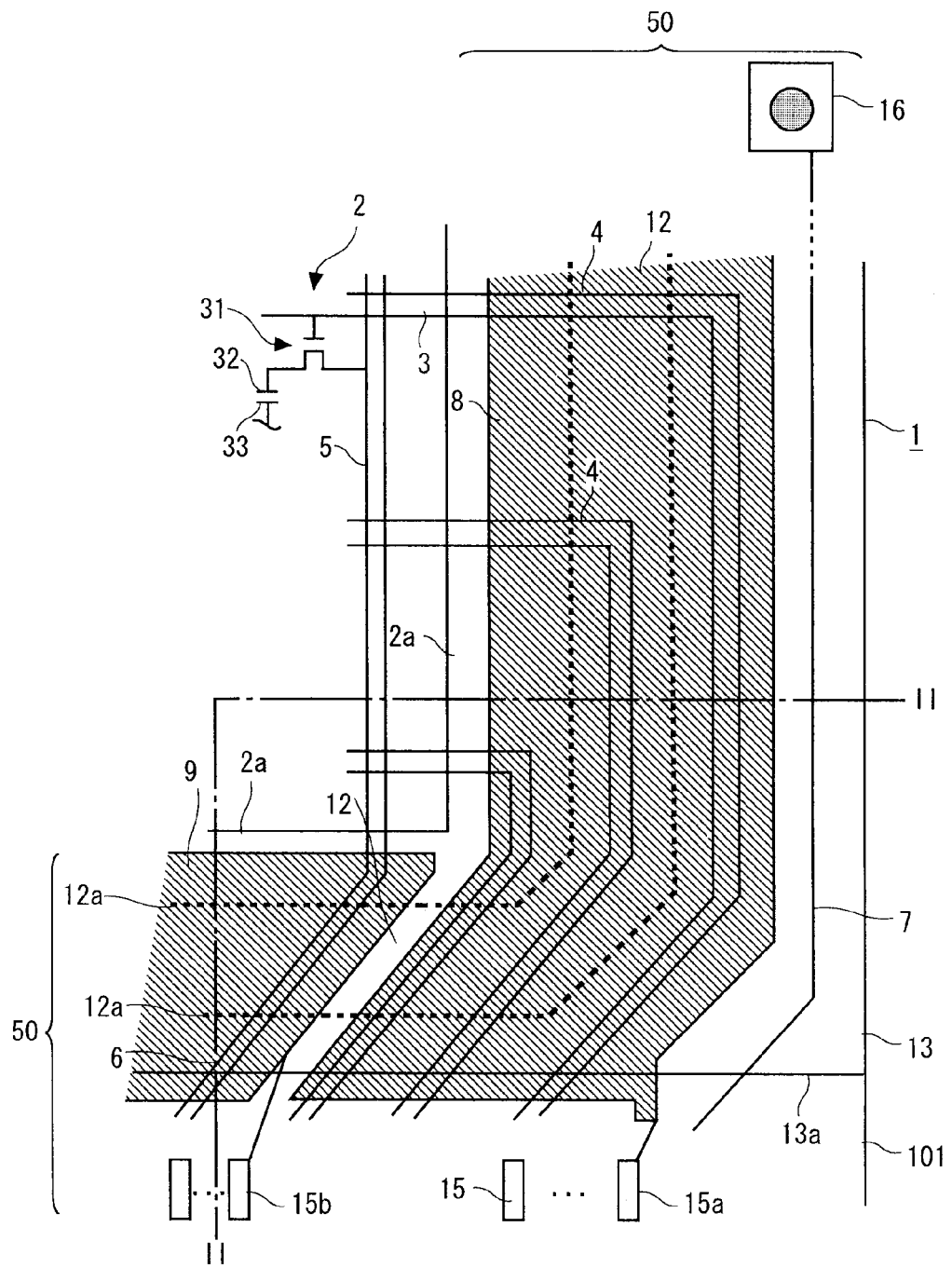
FIG. 1 is a plan view of the structure of an end portion of a liquid crystal panel of a liquid crystal display device according to a first embodiment of the present invention.

Hereinafter, embodiments of the present invention are described. The following description is directed to the embodiments of the present invention for illustrative purpose only, and the present invention should not be construed as limited to the following embodiments. Components etc. in the following description are omitted or simplified as appropriate for clear explanation. Those skilled in the art would easily understand that components can be changed, added, or exchanged in the following embodiments within the scope of the present invention. The same components are denoted by identical reference numerals throughout the drawings, and description thereof is omitted if not necessary.

First Embodiment

A liquid crystal display device according to a first embodiment of the present invention includes liquid crystal filled in between a TFT array substrate and an opposing substrate. Then, the TFT array substrate and the opposing substrate are bonded to each other with a sealing material applied around a display region like a frame. The TFT array substrate has scanning signal lines and display signal lines. A first conductive layer is formed over the scanning lead-out lines connected to the scanning signal lines. The first conductive layer is formed to cover the scanning lead-out lines outside at least the sealing material and applied with a predetermined potential. Incidentally, in this embodiment, an active matrix type liquid crystal display device is described below as an example of the display device, but the present invention is not limited to the active matrix type liquid crystal display device. That is, the present invention is applicable to any display device having a display material such as liquid crystal, particles, or liquid filled in between an array substrate and an opposing substrate. Accordingly, the present invention is applicable to electronic paper having such cell structure where a pair of substrates sandwiches a display material.

Figure 2:
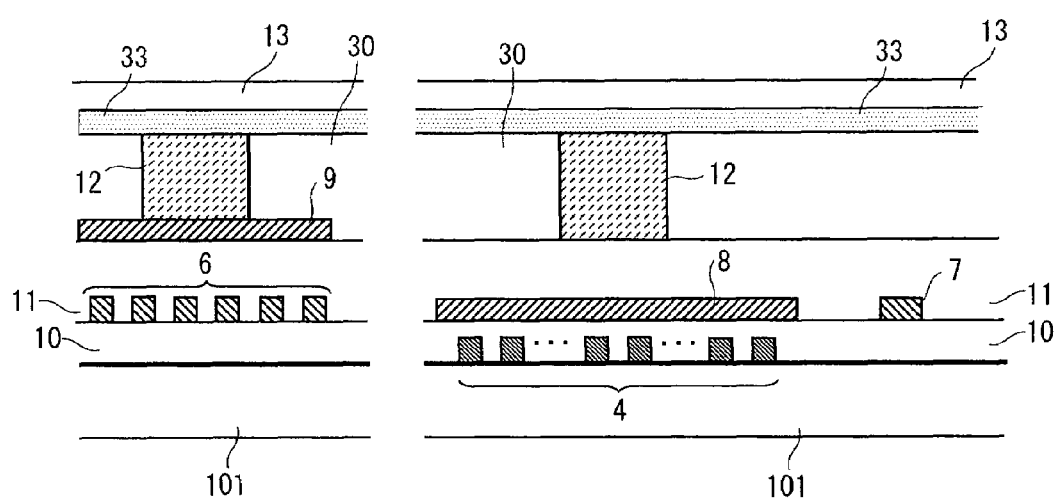
FIG. 2 is a sectional view taken along the line II-II of FIG. 1.

Referring to FIGS. 1 and 2, the liquid crystal display device of this embodiment is described. FIG. 1 is a schematic plan view showing the structure of an end portion of a liquid crystal panel used for the liquid crystal display device of this embodiment. Incidentally, FIG. 1 illustrates an end portion on the lower right hand corner of the liquid crystal panel 1. FIG. 2 is a sectional view taken along the line II-II of FIG. 1. Further, in this embodiment, it is assumed that a TFT array substrate 101 has a bottom gate type TFTs 31 formed thereof. Incidentally, a right side of FIG. 2 illustrates the portion including the scanning lead-out line 4 in section and a left side of FIG. 2 illustrates the portion including the display lead-out line 6 in section.

On the rectangular TFT array substrate 101, plural scanning signal lines 3 are formed in parallel. In FIG. 1, the plural scanning signal lines 3 extend in the horizontal direction at regular intervals. Plural display signal lines 5 are formed to cross the scanning signal lines 3 with a gate insulating film 10 as a first insulating film interposed therebetween. That is, the display signal lines 5 extend orthogonally to the scanning signal lines 3 on the gate insulating film 10 covering scanning signal lines 3. In FIG. 1, the plural display signal lines 5 extend in the vertical direction at regular intervals. As the TFT array substrate 101, for example, a transparent insulating substrate such as a glass substrate can be used. The scanning signal lines 3 and the display signal lines 5 have substantially the same film thickness in many cases. The gate insulating film 10 may be, for example, a silicon oxide film or silicon nitride film. The scanning signal lines 3 are supplied with scanning signals, and the display signal lines 5 are supplied with display signals corresponding to image data. The scanning signal lines 3 and the display signal lines 5 are made up of a thin metal film, for example, Al or Cr film.

TFTs 31 as the switching elements are formed around intersections between the scanning signal lines 3 and the display signal lines 5. The TFTs 31 are arrayed in the display region 2. The TFT 31 has a drain electrode and a source electrode formed in the same layer as the display signal lines 5. The source electrode and the drain electrode are connected through a semiconductor layer. The display signal line 5 is connected to the pixel electrode 32 through the TFT 31.

Hence, the scanning signal is used to turn on the TFT 31 to thereby supply the display signals from the display signal lines 5 to the pixel electrode 32. As a result, a driving voltage for driving the liquid crystal 30 is applied between an opposing electrode 33 provided on the opposing substrate 13 and the pixel electrode. The opposing electrode 33 is formed on, for example, almost the entire surface of the opposing substrate 13 to face the pixel electrode 32. Incidentally, the opposing electrode 33 and the pixel electrode 32 are made up of a transparent conductive film, for example, an ITO film.

An interlayer insulating film 11 as a second insulating film is formed between the pixel electrode 32 and the display signal line 5. Then, the drain electrode of the TFT is connected with the pixel electrode 32 through a contact hole formed in the interlayer insulating film 11. The pixel electrodes 32 are arrayed. The pixel electrodes 32 correspond to pixels. A region having the plural pixels arrayed therein is a display region 2. The display region 2 has a rectangular shape. The scanning signal lines 3 and the display signal lines 5 are formed in the display region 2. A peripheral portion of the display region 2 is a frame region 50. That is, a region inside an outer edge 2a of the display region 2 (upper left-hand side) is the display region 2, and a region outside the outer edge 2a of the display region 2 (lower right-hand side) is the frame region 50. Incidentally, the interlayer insulating film 11 may be, for example, a silicon oxide film or silicon nitride film, or an organic insulating film.

The frame region 50 is formed outside the display region 2. The frame region 50 is formed to surround the rectangular display region 2. That is, the frame region 50 is formed into a hollow square shape. In the frame region 50 of the TFT array substrate 101, a terminal 15 is formed. On the terminal 15, for example, a driving IC is mounted. The driving IC is provided near the lower edge of the TFT array substrate 101. For example, a driving IC that serves as both of a scanning signal driving IC and a display signal driving IC may be used. That is, the driving IC outputs a scanning signal and a display signal. The driving IC is connected to the scanning lead-out line 4 connected to the scanning signal line 3 and the display lead-out line 6 connected to the display signal line 5 through the terminal 15.

In the frame region 50, plural display lead-out lines 6 corresponding to the plural display signal lines 5 are formed. The plural display lead-out lines 6 are formed at a predetermined interval to avoid continuity with an adjacent line. The display lead-out line 6 extends from the terminal 15 to the lower edge of the display region 2. Then, the display lead-out line 6 is connected to the display signal line 5 at the outer edge 2a at the lower portion of the display region 2. Then, a display signal input from the driving IC to the terminal 15 is supplied to the display signal line 5 through the display lead-out line 6. The display lead-out line 6 and the display signal line 5 are made up of the same conductive layer. That is, the display lead-out lines 6 and the display signal lines 5 are integrally patterned. Incidentally, in FIG. 1, display signal lead-out lines 6 around the terminal 15 are omitted.

Further, in the frame region 50, plural scanning lead-out lines 4 corresponding to the plural scanning signal lines 3 are formed. The scanning lead-out line 4 extends from the terminal 15 to the outer edge 2a on the right side of the display region 2 by way of an outer portion of the lower right-hand corner of the display region 2. Then, the plural scanning signal lines 3 and the plural scanning lead-out lines 4 formed in the display region 2 are connected together. That is, scanning signals from the driving IC are input to the scanning signal lines 3 through the scanning lead-out line 4. The plural scanning lead-out lines 4 are provided at a predetermined interval to avoid continuity with an adjacent line. The scanning signal lines 3 and the scanning lead-out lines 4 are made up of, for example, the same conductive layer. That is, the scanning lead-out lines 4 and the scanning signal lines 3 are integrally patterned. The plural scanning lead-out lines 4 formed on the frame region 50 are connected to the scanning signal lines 3 in the order from the lower edge of the display region 2. In other words, the lowermost scanning signal line 3 of the display region 2 is connected to the leftmost scanning lead-out line 4. Then, the number of scanning lead-out lines 4 decreases toward the upper portion of the frame region 50.

The common line 7 is formed outside the scanning lead-out lines 4. The common line 7 is formed in the frame region 50. In other words, the scanning lead-out lines 4 extend between the common line 7 and the display region 2. Further, the common line 7 is formed outside the sealing material 12. A transfer electrode 16 is formed on an exposed portion of the common line 7. The transfer electrode 16 is made of a conductive material, for example, a silver paste or is a member prepared by coating a spacer or the like with a conductive material. The transfer electrode 16 is connected to the opposing electrode 33. That is, the driving IC outputs a common signal for supplying a common potential to the common line 7 through the terminal 15. Then, the common signal is input to the opposing electrode 33 through the transfer electrode 16 connected to the common line 7. As described above, the common line 7 is electrically interconnected with the opposing electrode 33 of the opposing substrate 13 by the transfer electrode 16. The transfer electrode 16 can be formed, for example, other than under the pattern of the sealing material 12. The common line 7 may extend up to another end portion opposite to the end portion where the driving IC is provided, and the transfer electrode 16 may be provided there.

The gate insulating film 10 is formed on the scanning signal lines 3 and the scanning lead-out lines 4. That is, the gate insulating film 10 is formed to cover the scanning signal lines 3 and the scanning lead-out lines 4. Then, the display signal lines 5, the display lead-out lines 6, and the common line 7 are formed on the gate insulating film 10. On the display signal lines 5, the display lead-out lines 6, and the common line 7, the interlayer insulating film 11 is formed. That is, the interlayer insulating film 11 is formed to cover the display signal lines 5, the display lead-out lines 6, and the common line 7. Then, the pixel electrode 32 is formed on the interlayer insulating film 11.

As the opposing substrate 13, a transparent insulating substrate such as a glass substrate is used. As for a color liquid crystal display device, a color filter and black matrix (BM) (not shown) are formed in the opposing substrate 13. Further, the opposing electrode 33 opposite to the pixel electrode 32 is formed on the color filter and the BM almost all over the opposing substrate 13. The opposing electrode 33 is connected to the transfer electrode 16. The TFT array substrate 101 and the opposing substrate 13 are opposite to each other and are bonded with the sealing material 12. The sealing material 12 is applied to surround the display region 2 like a frame. That is, the sealing material 12 is applied outside the outer edge 2a of the display region 2. Then, the sealing material 12 is formed on a part of the scanning lead-out lines 4 and the display signal lead-out lines 6.

The opposing substrate 13 and the TFT array substrate 101 sandwich a liquid crystal 30. That is, the liquid crystal 30 is filled in a space defined by the TFT array substrate 101, the opposing substrate 13, and the sealing material 12. As a result, the liquid crystal panel 1 is provided. Further, a spacer (not shown) for spacing the TFT array substrate 101 and the opposing substrate 13 at a predetermined gap may be provided. On the rear side of the liquid crystal panel, a backlight unit is provided. The backlight unit is a sheet-like light source that uniformly emits light to the entire surface. The backlight unit includes a light source such as an LED or a fluorescent tube, a light guide plate for guiding light from the light source to the entire surface, and an optical sheet such as a diffusing sheet or a prism sheet. Further, an external control circuit is connected with the TFT array substrate 101 through, for example, a flexible wiring board. The driving IC outputs a display signal, a scanning signal and a common signal based on the power supply voltage, control signal, and image data from the external control circuit. Then, the liquid crystal is driven in accordance with a voltage applied between the opposing electrode 33 and the pixel electrode 32. Thus, an amount of light transmitted through the liquid crystal panel 1 is controlled. Incidentally, an alignment layer for aligning the liquid crystal 30 may be provided to the TFT array substrate 101 or the opposing substrate 13. Further, a polarizing film or the like may be attached to the liquid crystal panel.

Here, in the frame region 50, a first conductive layer 8 is formed over the scanning lead-out line 4, and a second conductive layer 9 is formed over the display lead-out line 6. The first conductive layer 8 is formed on the gate insulating film 10. As the first conductive layer 8, the same thin metal film as that of the display signal lines 5 may be used. Thus, it is possible to prevent the number of manufacturing steps from being increased. The first conductive layer 8 is connected to a terminal 15a. Then, the first conductive layer 8 extends upward along the scanning lead-out line 4 in FIG. 1. The first conductive layer 8 is formed with a large width to cover the plural scanning lead-out lines 4. Further, the first conductive layer 8 is formed along the sealing material 12 and patterned with a larger width than the sealing material 12. That is, the first conductive layer 8 protrudes from the sealing material 12. Accordingly, a portion of the first conductive layer 8 is outside the sealing material 12. Then, the first conductive layer 8 is formed from the outer portion to the inner portion of the sealing material 12. As a result, almost all of the portion of the plural scanning lead-out lines 4 outside the sealing material 12 is covered with the first conductive layer 8. That is, a pattern of the first conductive layer 8 is formed outside the outermost line of the plural scanning lead-out lines 4.

Further, the first conductive layer 8 is formed to cover the scanning lead-out line 4 in the region including the scanning lead-out line 4 and the opposing electrode 33. That is, in the region where the opposing electrode 33 is formed above the scanning lead-out line 4, the first conductive layer 8 is formed between the scanning lead-out line 4 and the opposing electrode 33. Then, the first conductive layer 8 is formed in almost all of the region where the scanning lead-out line 4 faces the opposing electrode 33 so as to cover the plural scanning lead-out lines 4. The first conductive layer 8 is applied with a predetermined potential through the terminal 15a from the driving IC.

Further, the second conductive layer 9 is formed over the display lead-out line 6. The second conductive layer 9 is formed on the interlayer insulating film 11. The second conductive layer 9 can be formed in the same layer as that of the pixel electrode 32. Hence, it is possible to prevent the number of manufacturing steps from being increased. The second conductive layer 9 is formed to cover the display lead-out line 6 outside the sealing material 12 similar to the first conductive layer 8 covering the scanning lead-out line 4.

The second conductive layer 9 is connected to a terminal 15b. Then, the second conductive layer 9 extends leftward in FIG. 1 to cover the plural display lead-out lines 6. Further, a pattern of the second conductive layer 9 extends along the sealing material 12. The second conductive layer 9 protrudes from the sealing material 12. That is, a portion of the second conductive layer 9 is outside the sealing material 12. Then, the second conductive layer 9 is formed from the outer portion to the inner portion of the sealing material 12. Thus, almost all of the portion of the plural display lead-out lines 6 outside the sealing material 12 is covered with the second conductive layer 9.

Further, the second conductive layer 9 covers the display lead-out line 6 in a region including the display lead-out line 6 and the opposing electrode 33. That is, in the region where the opposing electrode 33 is formed above the display lead-out line 6, the second conductive layer 9 is formed between the display lead-out line 6 and the opposing electrode 33. Then, the second conductive layer 9 is formed in almost all of the region where the display lead-out line 6 and the opposing electrode 33 face each other so as to protect the plural display lead-out lines 6. The second conductive layer 9, is supplied with a predetermined potential from the driving IC through the terminal 15b.

Incidentally, an outer edge 13a of the opposing substrate 13 might be shifted from the original design position by about several hundreds of μm due to variations in a cutting step of the opposing substrate 13 of liquid crystal panel 1. In such cases, for example, as shown in FIG. 1, the first conductive layer 8 or the second conductive layer 9 protrude from the outer edge 13a of the opposing substrate 13 on the terminal 15 side. As a result, the first conductive layer 8 and the second conductive layer 9 protrude to the region having no opposing electrode 33.

Figure 3:
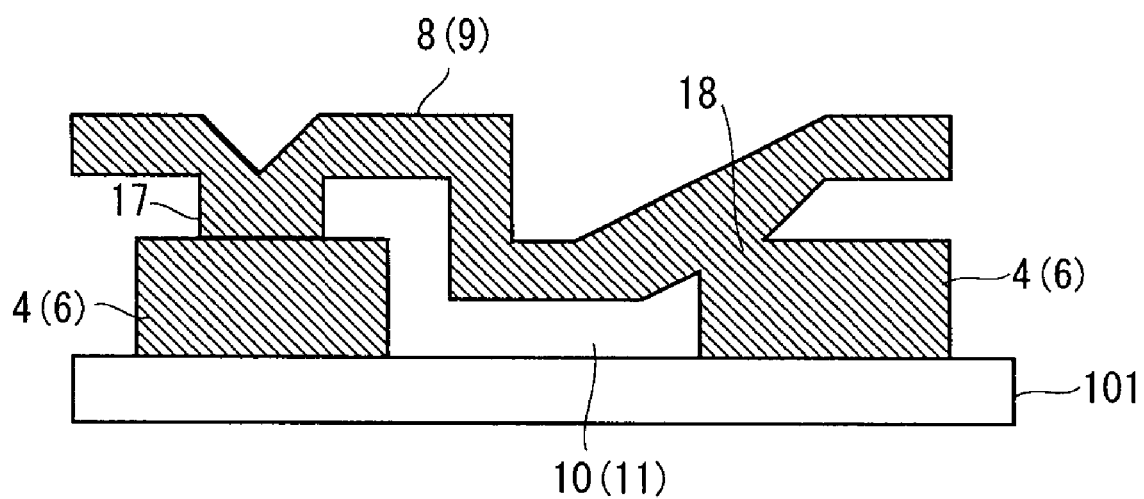
FIG. 3 is a sectional view of the structure around a defect of a TFT array substrate.
Figure 4:
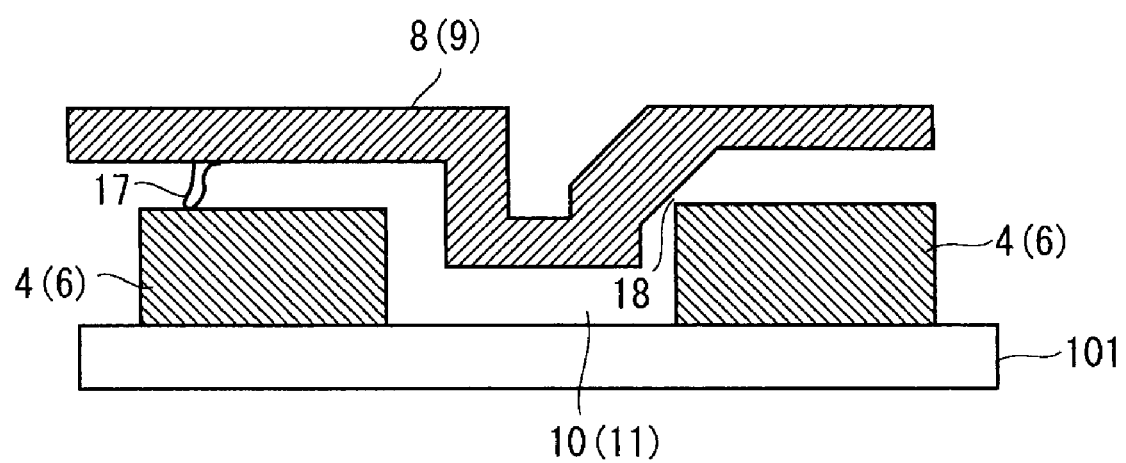
FIG. 4 is a sectional view of the structure around a small defect of the TFT array substrate.

As described above, the lead-out line can be protected with the first conductive layer 8 and the second conductive layer 9. Referring to FIGS. 3 and 4, the above is described next. FIGS. 3 and 4 schematically show the structure around the defective portion of the TFT array substrate 101. For example, it is assumed that within the region where the first conductive layer 8 is arranged over the scanning lead-out line 4, a film defect 17 or a coverage defect 18 exists in the gate insulating film 10. Here, as for the film defect 17, a pinhole or the like exists in the gate insulating film 10, and the first conductive layer 8 and the scanning lead-out line 4 are not insulated from each other. Further, as for the coverage defect 18, a pattern edge of the scanning lead-out line 4 is not completely covered with the gate insulating film 10. Therefore, the scanning lead-out line 4 under the film defect 17 or coverage defect 18 is short-circuited with the first conductive layer 8.

A step of checking continuity between the first conductive layer 8 and the scanning lead-out line 4 is inserted to the manufacturing process, and thus the defective liquid crystal panel 1 can be detected as an initial defective product. For example, the TFT array substrate 101 and the opposing substrate 13 are bonded to complete the liquid crystal panel 1, after which the continuity between the first conductive layer 8 and the scanning lead-out line 4 is tested. Then, if continuity is attained between the first conductive layer 8 and the scanning lead-out line 4, the device is detected as a defective product. On the other hand, the first conductive layer 8 and the scanning lead-out line 4 are insulated from each other, the device is assumed non-defective, and the procedure advances to the next manufacturing step. Thus, it is possible to prevent a detective product from being transferred to the next manufacturing step to improve productivity. Incidentally, the step of checking the continuity may be carried out after, for example, the step of filling a liquid crystal and sealing a filling port.

On the other hand, if the film defect 17 or the coverage defect 18 of the gate insulating film 10 is small, there is no continuity between the first conductive layer 8 and the scanning lead-out line 4. That is, it is assumed that the film defect 17 or the coverage defect 18 is small enough to prevent the first conductive layer 8 and the scanning lead-out line 4 from being short-circuited as shown in FIG. 4. In this case, the first conductive layer 8 covers the small film defect 17 or coverage defect 18 on the scanning lead-out line 4. Accordingly, even if water drops to the surface of the TFT array substrate 101, it is possible to prevent the water from infiltrating into the film defect 17 or the coverage defect 18. Thus, the scanning lead-out line 4 is protected against the water or the like, so a corrosion reaction with the scanning lead-out line 4 can be avoided. Accordingly, the deterioration of the display quality can be prevented. Further, it is possible to prevent the deterioration of the display quality after the shipping, and reliability thereof can be improved.

Incidentally, in the above description, the first conductive layer 8 protects the scanning lead-out line 4, but the second conductive layer 9 may protect the display lead-out line 6 as indicated by the numbers in parentheses as shown in FIGS. 3 and 4. That is, as shown in FIGS. 3 and 4, the second conductive layer 9 is formed to cover the upper portion of the display lead-out line 6. Thus, the display lead-out line 6 can be protected from the film defect 17 or the coverage defect 18. Thus, it is possible to prevent the deterioration of the display quality, and reliability thereof can be improved.

Here, a potential supplied to the first conductive layer 8 and the second conductive layer 9 is preferably close to a common potential applied to the opposing electrode 33. That is, signals are input to the first conductive layer 8 and the second conductive layer 9 such that a potential difference from the potential of the opposing electrode 33 becomes equal to or smaller than a difference that causes no corrosion (electrolytic corrosion) between the first conductive layer 8 and the second conductive layer 9. For example, a common signal can be supplied from the terminal 15 to the first conductive layer 8 and the second conductive layer 9. Thus, the first conductive layer 8 and the second conductive layer 9 have a common potential equal to the potential of the opposing electrode 33. Thus, even if the interlayer insulating film 11 on the first conductive layer 8 has a defect, for example, a corrosion reaction in the first conductive layer 8 due to water can be avoided.

Incidentally, in the case of applying a common potential to the first conductive layer 8 or second conductive layer 9 from the terminal 15, the first conductive layer 8 or second conductive layer 9 can function as the common line 7 in FIG. 1. For example, the pattern width of the first conductive layer 8 can be increased up to the common line 7. Thus, an effective line width of the common line 7 is increased to reduce a wiring resistance. Thus, a delay of the common signal can be improved to improve the display quality. A common signal may be directly input to the terminal 15 from the driving IC.

Incidentally, if it is difficult to provide the terminal 15 for applying a potential to the first conductive layer 8 or the second conductive layer 9 due to circuit limitations or on the ground that the first conductive layer 8 or the second conductive layer 9 crosses the other lines, a common signal can be input from the opposing electrode 33. More specifically, the transfer electrode 16 is formed on the first conductive layer or the second conductive layer 9. Thus, the first conductive layer 8 or the second conductive layer 9 is connected with the opposing electrode 33 through the transfer electrode 16. The opposing electrode 33 is supplied with a common signal from the driving IC through the other transfer electrode 16 connected to the common line 7, for example. Accordingly, a common potential is supplied to the first conductive layer 8 or the second conductive layer 9 from the driving IC through the opposing electrode 33.

Incidentally, a potential applied to the first conductive layer 8 or the second conductive layer 9 is not limited to the common potential. For example, a potential equal to an average potential of the common potential may be supplied. Alternatively, a potential equal to a median potential of the display signal potential applied to the display signal lines 5 may be applied. A potential closer to the common potential of the opposing electrode 33 than the display signal potential is applied to the first conductive layer 8 and the second conductive layer 9. Thus, this enable to reduce a potential difference between the opposing electrode 33 and the first conductive layer 8 or the second conductive layer 9 to prevent an electrolytic corrosion reaction at a defective portion. That is, the first conductive layer 8 is formed over the scanning lead-out line 4 having a large potential difference from the common potential, so even if water drops to the surface of the TFT array substrate 101, a corrosion reaction in the scanning lead-out line 4 can be prevented.

Incidentally, in the above description, the first conductive layer 8 is formed in the same layer as the display signal lines 5 and display lead-out line 6, but the present invention is not limited thereto. For example, the first conductive layer 8 may be formed in the same layer as the pixel electrode 32. In this case, the first conductive layer 8 and the second conductive layer 9 are formed in the same layer as the pixel electrode 32. Further, the first conductive layer 8 may be formed in the same layer in the semiconductor layer of the TFT 31. In this case, the first conductive layer 8 is formed on the gate insulating film 10 and covered with the interlayer insulating film 11. That is, similar to an example where the layer is formed in the same layer as the display signal line 5, the first conductive layer 8 is formed between the gate insulating film 10 and the interlayer insulating film 11. Further, in the above description, the second conductive layer 9 is formed in the same layer as the pixel electrode 32, but may be formed in the same layer as the display signal lines 5. In this case, the display lead-out line 6 is formed in the same layer as the scanning signal line 3. Then, a layer conversion portion is formed to connect the display lead-out lines 6 and the display signal lines 5. Thus, the first conductive layer 8 and the second conductive layer 9 are formed in the same conductive layer. Further, in the case of using the display lead-out line 6 the layer of which is converted to a lower layer is used as described above, the second conductive layer 9 can be formed in the same layer as the semiconductor layer of the TFT 31. Incidentally, the liquid crystal display device of the present invention is not limited to the bottom gate type TFTs 31. As described above, according to the line structure of the TFT array substrate 101, layers of the first conductive layer 8 and the second conductive layer 9 can be appropriately changed.

As described above, the first conductive layer 8 is formed over the scanning lead-out line 4 in the frame region 50 with the gate insulating film 10 interposed therebetween. Then, the first conductive layer 8 covers the scanning lead-out line 4 in at least a region outside the sealing material 12. Thus, if there is the film defect 17 in the gate insulating film 10, the defect can be detected as a short-circuit defect. Thus, it is possible to prevent deterioration of display quality due to the corrosion reaction after shipping. Further, if the film defect 17 of the gate insulating film 10 is small, the first conductive layer 8 covers the small film defect 17, so a corrosion reaction can be prevented. That is, water that drops to the TFT array substrate 101 can be prevented from infiltrating into the TFT array substrate 101. Thus, a corrosion reaction and disconnection resulting from a potential difference between the scanning lead-out line 4 and the opposing electrode 33 can be avoided, and reliability can be improved. Further, the first conductive layer 8 is applied with a potential close to the common potential, making it possible to prevent a corrosion reaction between the first conductive layer 8 and the opposing electrode 33.

Second Embodiment

Figure 5:
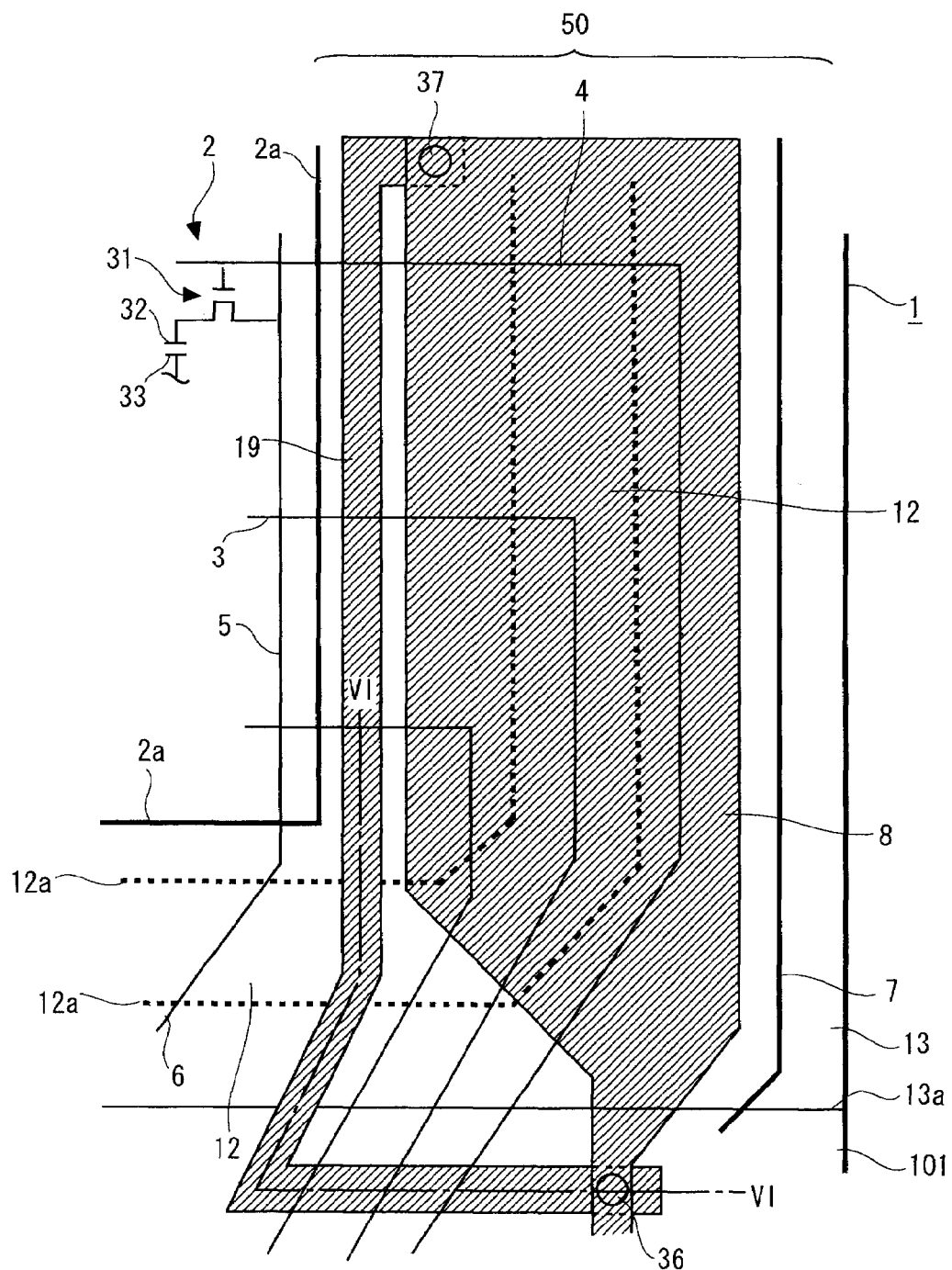
FIG. 5 is a plan view of the structure of an end portion of a liquid crystal panel of a liquid crystal display device according to a second embodiment of the present invention.
Figure 6:
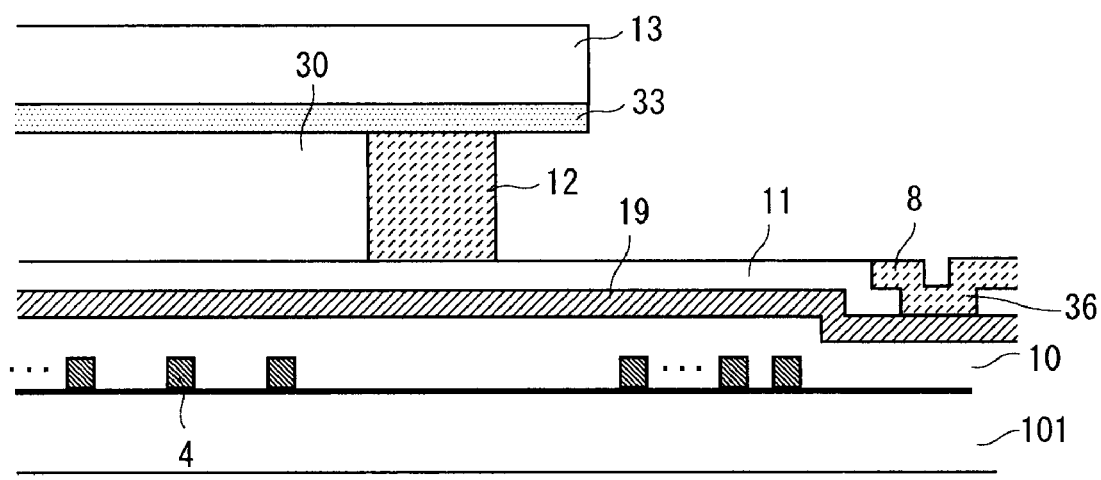
FIG. 6 is a sectional view taken along the line VI-VI of FIG. 5.

In this embodiment, a liquid crystal display device is described as an example of the display device similar to the first embodiment. Referring to FIGS. 5 and 6, the liquid crystal display device of this embodiment is described. FIG. 5 is a plan view of the structure of an end portion of the liquid crystal panel 1, and FIG. 6 is a sectional view taken along the line VI-VI of FIG. 5. Incidentally, the basic structure of the liquid crystal display device of this embodiment is the same as the first embodiment, so its description thereof is omitted. For example, first conductive layer 8 is formed to cover almost all of the scanning lead-out line 4 outside the sealing material 12.

Further, the liquid crystal TFT array substrate 101 of the display device of this embodiment has a repair pattern 19 as shown in FIG. 5. The repair pattern 19 can repair the short-circuited portion of the scanning lead-out line 4. The repair pattern 19 is formed closer to the display region 2 side than the first conductive layer 8. That is, the repair pattern 19 is formed between the outer edge 2a of the display region 2 and the first conductive layer 8. Then, the repair pattern 19 and the scanning lead-out line 4 are insulated before repair.

As shown in FIG. 5, the repair pattern 19 is branched off from the pattern of the first conductive layer 8. That is, no conductive film is formed on the scanning lead-out line 4 in a region between the first conductive layer 8 and the repair pattern 19. Further, the repair pattern 19 is formed between the interlayer insulating film 11 and the gate insulating film 10 as shown in FIG. 6. Further, in this embodiment, as shown in FIG. 6, the first conductive layer 8 is formed on the interlayer insulating film 11. That is, the repair pattern 19 is formed in the same layer as the display signal lines 5, and the first conductive layer 8 is formed in the same layer as the pixel electrode 32. The repair pattern 19 is connected to the first conductive layer 8 through the contact holes 36 and 37 formed in the interlayer insulating film 11. That is, both edges of the repair pattern 19 overlap with the first conductive layer 8, and the two contact holes 36 and 37 are formed in the overlap area.

Here, the contact hole 36 is formed outside the sealing material 12. Further, the contact hole 36 is formed in a region where no opposing substrate 13 opposes to the TFT array substrate 101. On the other hand, the contact hole 37 is formed inside the sealing material 12. Here, the repair pattern 19 is formed to intersect with each of the plural scanning lead-out lines 4 at two positions. That is, in a region including no opposing substrate 13, the repair pattern 19 crosses each scanning lead-out line 4. Further, the repair pattern 19 crosses each scanning lead-out line 4 in a region between the display region 2 and the first conductive layer 8. As described above, the repair pattern 19 is formed to cross each scanning lead-out line 4 twice. In other words, the repair pattern 19 branched off from the first conductive layer 8 in the contact hole 36 outside the sealing material 12 crosses each scanning lead-out line 4 outside the sealing material 12 and then extends up to the inner portion of the sealing material 12. Further, the repair pattern 19 extending to the inner portion of the sealing material 12 crosses each scanning lead-out line 4 again and is connected with the first conductive layer 8 at the contact hole 37. Here, the repair pattern 19 extends up to an end portion on the opposite side to the contact hole 36 such that the repair pattern 19 crosses all the scanning lead-out lines 4. Accordingly, for example, the contact hole 37 is formed near the end portion on the opposite side to the driving IC side.

Figure 7:
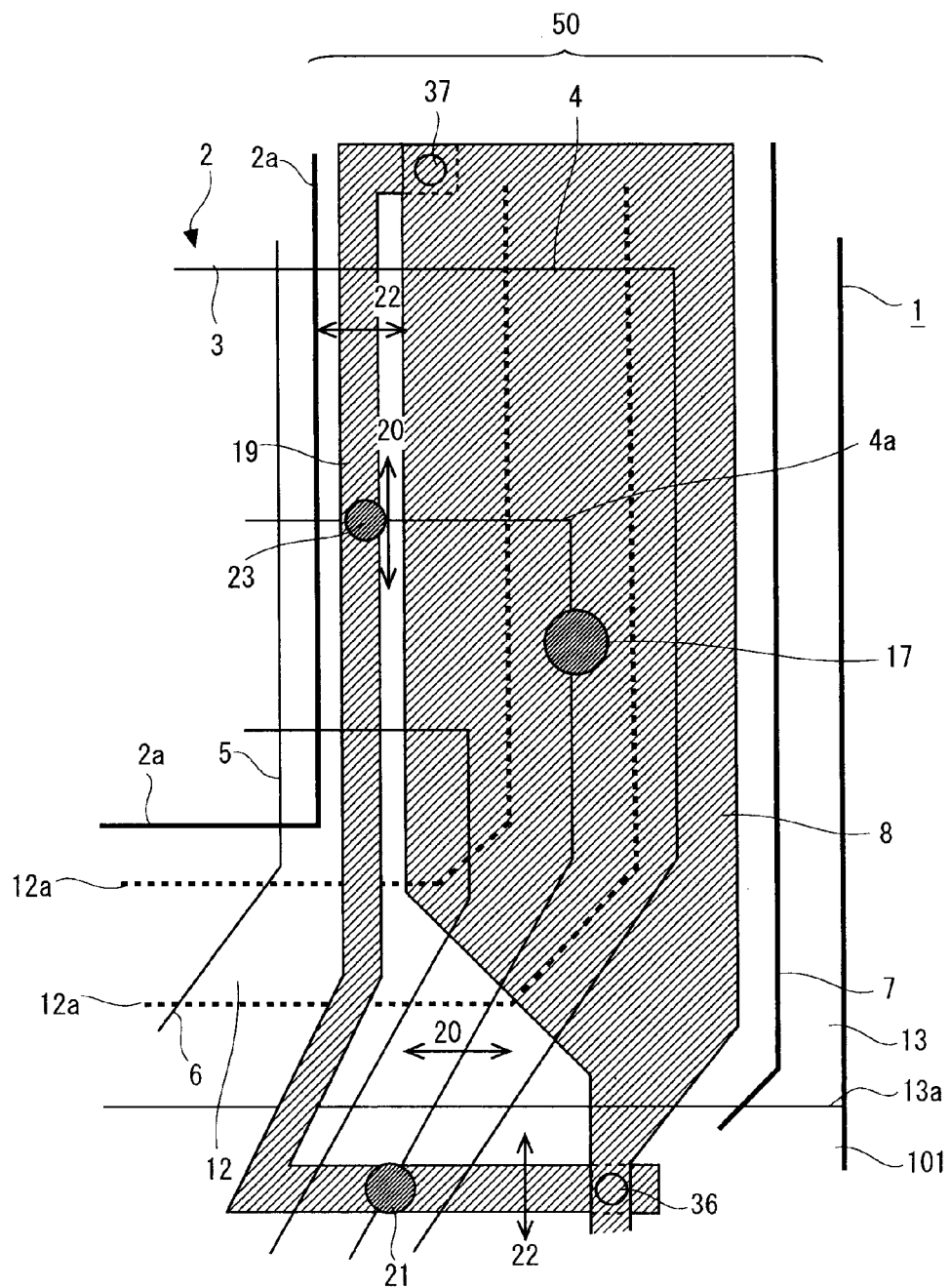
FIG. 7 is a plan view of the structure of an end portion of a liquid crystal panel of the liquid crystal display device of the second embodiment after repair of disconnection.

The repair pattern 19 is formed to thereby repair the short-circuited portion of the scanning lead-out line 4. For example, as shown in FIG. 7, the film defect 17 exists in the interlayer insulating film 11 to thereby short-circuit a scanning lead-out line 4a with the first conductive layer 8. In this case, a scanning signal cannot be input to the scanning signal line 3 connected to the scanning lead-out line 4 while the scanning lead-out line 4a is short-circuited. Thus, a line defect occurs in the display region 2. Such defects can be repaired with the repair pattern 19.

More specifically, conduction portions 21 and 23 are formed on both sides of the film defect 17. That is, the conduction portion 21 is formed at an intersection between the scanning lead-out line 4a and the repair pattern 19 outside the sealing material 12. Further, the conduction portion 23 is formed at an intersection between the scanning lead-out line 4a and the repair pattern 19 inside the sealing material 12. The conduction portion 21 is formed by applying laser light to the intersection, for example. That is, the laser light is applied to the intersection to attain continuity with the repair pattern 19 and the short-circuited scanning lead-out line 4a. Then, the connection between the repair pattern 19 and the first conductive layer 8 is cut at a cut portion 22. The cut portion 22 is formed in two portions closer to the terminal side of the repair pattern 19 than the conduction portions 21 and 23. More specifically, one cut portion 22 is formed between the conduction portion 21 and the contact hole 36, and another cut portion 22 is formed between the conduction portion 23 and the contact hole 37. Here, laser light is applied to the cut portion 22 to thereby cut the repair pattern 19 from the first conductive layer 8. Further, two cut portions 20 are formed to sandwich the short-circuited portion due to the film defect 17. In the cut portion 20, the scanning lead-out line 4a is cut by laser irradiation. A short-circuited portion due to the film defect 17 is positioned between the two cut portions 20 where the scanning lead-out line 4a is cut. Thus, both end portions of the scanning lead-out line 4a are cut away from the short-circuited portion. The cut portion 20 is formed in a region not overlapped with the first conductive layer 8.

As described above, two conduction portions 21 and 23 are formed at intersections between the short-circuited scanning lead-out line 4a and repair pattern 19. Then, two cut portions 22 are formed in the repair pattern 19 and two cut portions 20 are formed in the scanning lead-out line 4a. As a result, a short-circuited signal path of the scanning lead-out line 4a can be bypassed. That is, a scanning signal is supplied to the scanning signal line 3 connected with the short-circuited scanning lead-out line 4a in the order of the scanning lead-out line 4a, the conduction portion 21, the repair pattern 19, the conduction portion 23, and the scanning lead-out line 4a from the terminal 15. Thus, a scanning signal can be input to the scanning signal line 3 corresponding to the scanning lead-out line 4a by way of the bypass path. Thus, the line defect resulting from the short-circuiting between the scanning lead-out line 4a and the repair pattern 19 can be repaired. Thus, it is possible to provide a high-display-quality display device having no line defect.

Incidentally, the interlayer insulating film 11 might be damaged by laser applied for forming the conduction portions 21 and 23 or the cut portion 22. If water drops to the damaged portion and a line having a different potential exists near the damaged portion, a corrosion reaction might occur between the scanning lead-out line 4 and the line. To prevent the corrosion reaction, the conduction portion 21 and one cut portion 22 are preferably formed in a region not opposite to the opposing electrode 33. That is, laser light is applied to a region outside the opposing electrode 33 to form the conduction portion 21 and one cut portion 22. On the other hand, it is preferred to form the conduction portion 23 and one cut portion 22 in the region inside the sealing material 12 to which almost no water infiltrates. Accordingly, laser light is applied to a region outside the outer edge 13a of the opposing substrate 13 to form one cut portion 22 and conduction portion 21. Thus, in a region including no opposing electrode 33, one cut portion 22 and the conduction portion 21 are formed. Further, laser light is applied near the display region 2 inside the sealing material 12 to form another cut portion 22 and conduction portion 23. Thus, in the region where the liquid crystal 30 is filled and almost no water infiltrates from the outside, one cut portion 22 and conduction portion 23 are formed. Thus, an electrolytic corrosion reaction can be prevented at the laser-illuminated portions, and the display quality can be improved.

The above repair step is inserted to the manufacturing process to thereby repair a line defect. For example, in the step of checking continuity between the first conductive layer 8 and the scanning lead-out line 4, a scanning lead-out line 4a having continuity with the first conductive layer 8 is determined. The checking step may be carried out after the step of bonding the TFT array substrate 101 and the opposing substrate 13, for example. Conduction portions 21 and 23 are formed in the scanning lead-out line 4a short-circuited with the first conductive layer 8. Further, two cut portions 22 are formed to cut the repair pattern 19 from the first conductive layer 8. Thus, a defective product with a short-circuited portion can be repaired and transferred to the next manufacturing step. Thus, productivity can be improved. Incidentally, the step of checking the continuity can be carried out after the step of filling a liquid crystal and sealing a filling port, for example.

As described above, the repair pattern 19 is branched off from the first conductive layer 8 to thereby repair a short-circuited portion of the first conductive layer 8 and the scanning lead-out line 4. That is, the repair pattern 19 can be used as a redundant line for bypassing the short-circuited portion, so yield can be improved. Incidentally, in the above description, the structure regarding the scanning lead-out line 4 is mainly described, but the repair pattern 19 may be formed also in the display lead-out line 6 for repairing a short-circuited portion. Incidentally, a short-circuited portion can be repaired without forming the contact holes 36 and 37. In this case, the repair pattern 19 is in a floating state as a state of being not electrically connected with the first conductive layer 8. With this structure, a bypass path may be formed without forming the cut portion 22. Thus, a short-circuited portion can be easily repaired.

Third Embodiment

Figure 8:
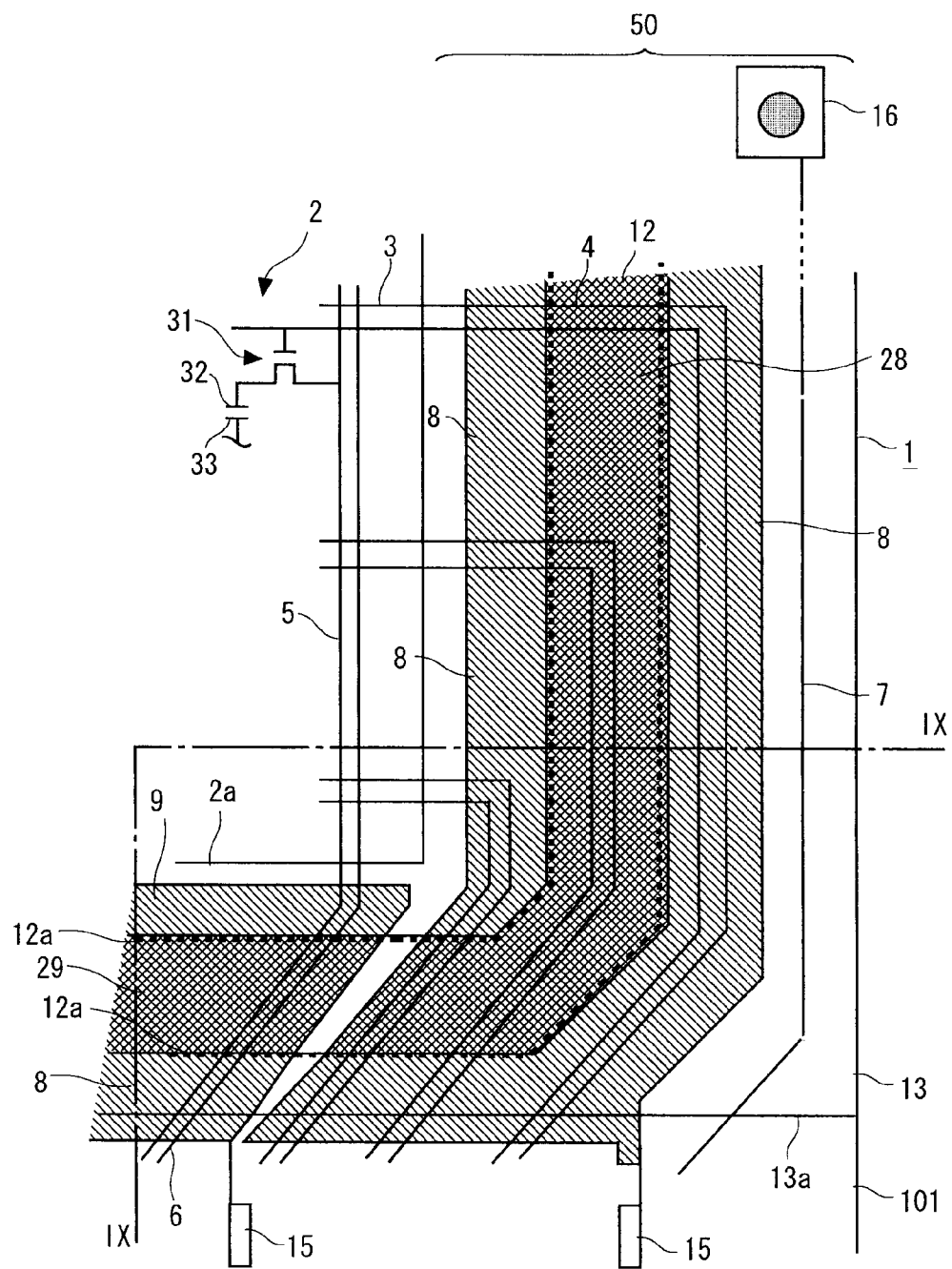
FIG. 8 is a plan view of the structure of an end portion of a liquid crystal panel of a liquid crystal display device according to a third embodiment of the present invention.
Figure 9:
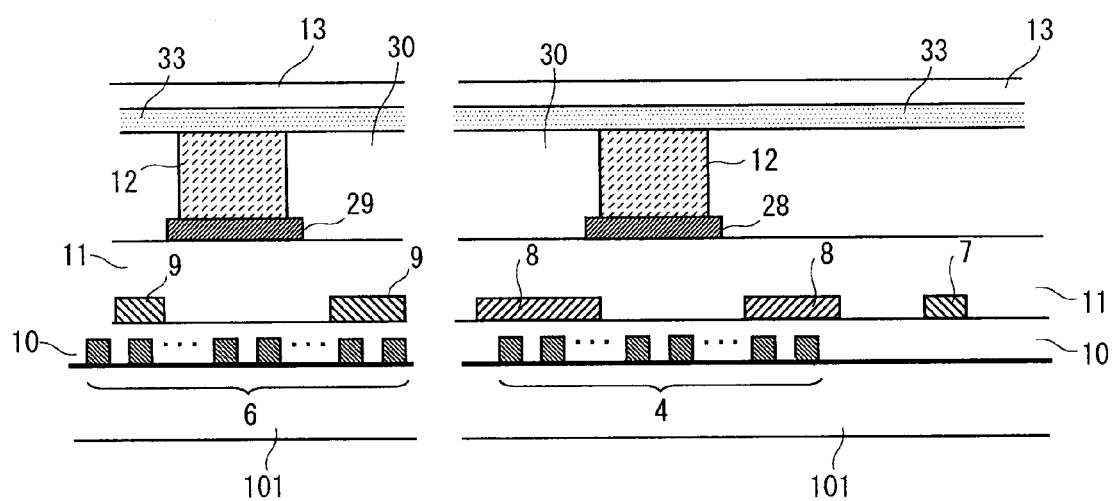
FIG. 9 is a sectional view taken along the line IX-IX of FIG. 8.

In this embodiment, a liquid crystal display device is described as an example of the display device similar to the first embodiment. Referring to FIGS. 8 and 9, the liquid crystal display device of this embodiment is described. FIG. 8 is a plan view of the structure of an end portion of the liquid crystal panel 1, and FIG. 9 is a sectional view taken along the line IX-IX of FIG. 8. Incidentally, the basic structure of the liquid crystal display device of this embodiment is the same as the first embodiment, so its description thereof is omitted.

That is, first conductive layer 8 is formed to cover almost all of the scanning lead-out line 4 outside the sealing material 12.

In this embodiment, the scanning lead-out line 4 is covered with a third conductive layer 28 as well as the first conductive layer 8. Here, the third conductive layer 28 covers the scanning lead-out line 4 just below the pattern of the sealing material 12. Accordingly, the first conductive layers 8 are formed away from each other inside and outside the outer edge of the sealing material 12. In other words, the first conductive layer 8 is formed on both sides of the sealing material 12 along the sealing material 12. The third conductive layer 28 is formed in a region between the first conductive layers 8 on the interlayer insulating film 11. The third conductive layer 28 is formed in the same layer as the pixel electrode 32, for example.

Here, the first conductive layer 8 is formed in the same layer as the display signal lines 5 as in the first embodiment, but the third conductive layer 28 is formed on the interlayer insulating film 11. Thus, an insulating film just below the sealing material 12 can be made thicker than in the other regions. Accordingly, in the region just below the sealing material 12, an insulating film between the scanning lead-out line 4 and the conductive layer is thicker than in the regions outside and inside the sealing material 12. That is, in the region just below the sealing material 12, the total thickness of the gate insulating film 10 and interlayer insulating film 11 between the first conductive layer 8 and the scanning lead-out line 4 is larger than in the regions other than the region just below the sealing material 12. Incidentally, since there is a displacement of about 200 µm at the maximum in the step of applying the sealing material 12, it is necessary to determine a region where an insulating film is formed with a large thickness between the conductive layer and the scanning lead-out line 4, in consideration of the displacement.

As described above, if the insulating film is made thicker in the region just below the sealing material 12, damage on the insulating film can be minimized in a bonding step. That is, in the bonding step, the sealing material is applied between the TFT array substrate 101 and the opposing substrate 13, and is cured while the two substrates are pressure-bonded. During this pressure-bonding, in a region just below the sealing material 12, the insulating film might be damaged. In particular, the sealing material 12 may have a spacer for keeping a predetermined cell gap (substrate interval). Such a spacer is formed of a hard material such as glass or hard resin with a bead shape having the diameter of several microns or rod shape. In such cases, it is highly likely that the interlayer insulating film 11 just below the sealing material 12 has defects such as scratches and dents upon pressure-bonding. The spacer in the sealing material 12 might cause short-circuiting between the first conductive layer 8 and the scanning lead-out line 4. However, in this embodiment, the insulating film formed on the scanning lead-out line 4 is thick, so damages are alleviated.

As described above, in this embodiment, the conductive layer covering the scanning lead-out line 4 is formed with different layers between in the region just below the sealing material and the remaining regions. Then, in a region just below the sealing material 12, the total thickness of the insulating film is increased. In this case, the number of insulating film layers may be increased only just below the sealing material 12, or the thickness of one or more insulating film layers may be increased. Thus, in a region just below the sealing material 12, the total thickness of the insulating film can be increased. Accordingly, it is possible to avoid any damage in a region just below the sealing material 12, and a display quality can be improved. Incidentally, in the above description, the scanning lead-out line 4 is discussed, but the same applies to the display lead-out line 6. That is, a fourth conductive layer 29 covering the display lead-out line 6 is formed in a layer different from the second conductive layer 9 just below the sealing material 12. Thus, the total thickness of the insulating film just below the sealing material 12 is increased, and damage at the region just below the sealing material 12 can be reduced. Thus, display quality can be improved. Incidentally, in this embodiment, the display lead-out line 6 and the scanning lead-out line 4 are formed in the same layer. A layer conversion portion for connecting the display lead-out lines 6 and the display signal lines 5 is formed. Further, the first conductive layer 8 and the second conductive layer 9 are formed with the same conductive layer. Accordingly, the display lead-out line 6 is covered with the second conductive layer 9 formed in the same layer as the display signal lines 5 and the fourth conductive layer 29 formed in the same layer as the pixel electrode 32.

As described above, in a region including the sealing material 12, an insulating film formed between the conductive layer and the scanning lead-out line 4 is made thicker than in the other regions. Thus, a defect due to the spacer can be avoided. Incidentally, in the above description, the structure regarding the scanning lead-out line 4 is mainly described, but an insulating film formed above the display lead-out line 6 may be changed between the region just below the sealing material and the remaining regions.

Fourth Embodiment

Figure 10:
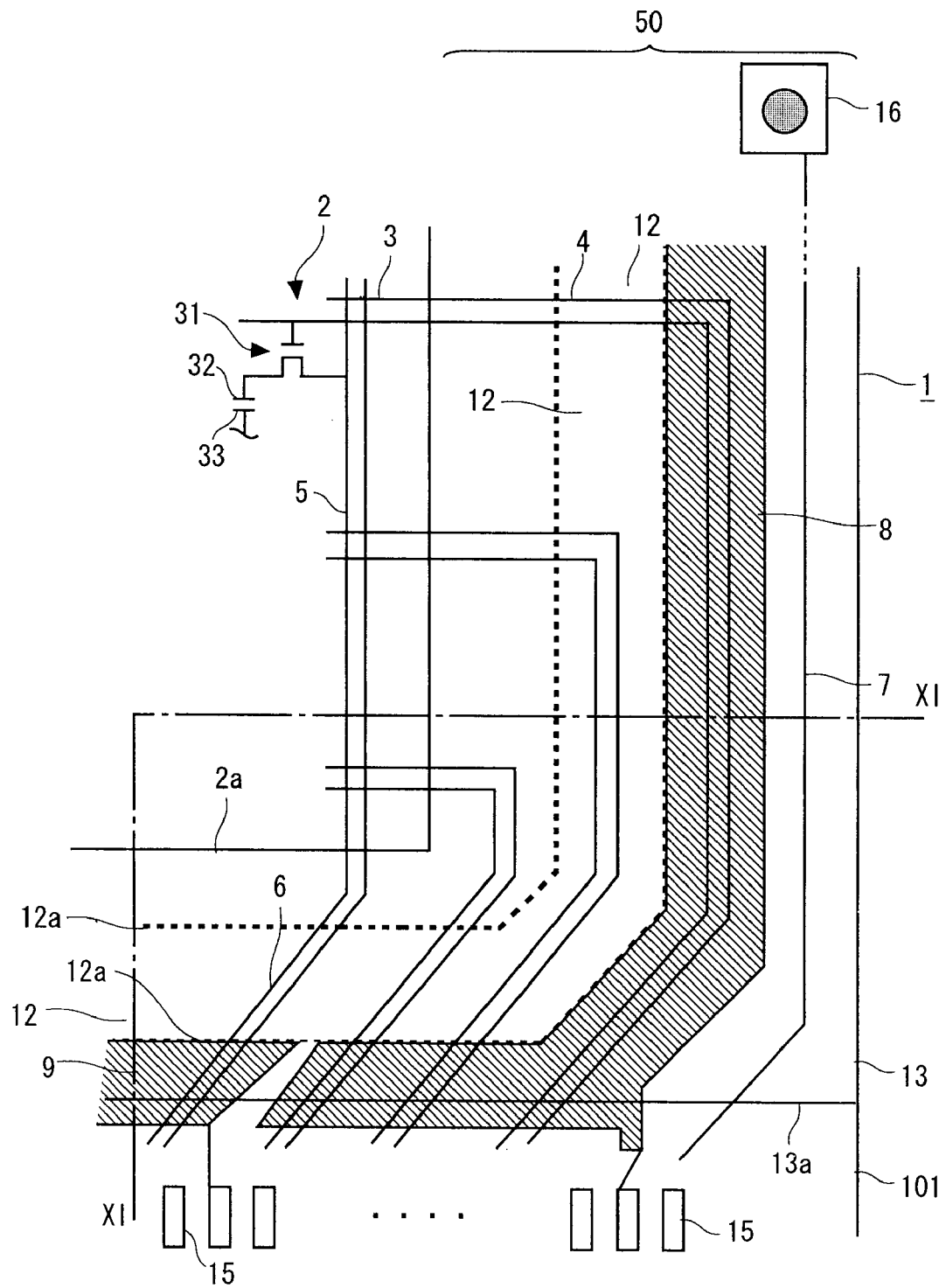
FIG. 10 is a plan view of the structure of an end portion of a liquid crystal panel of a liquid crystal display device according to a fourth embodiment of the present invention.
Figure 11:
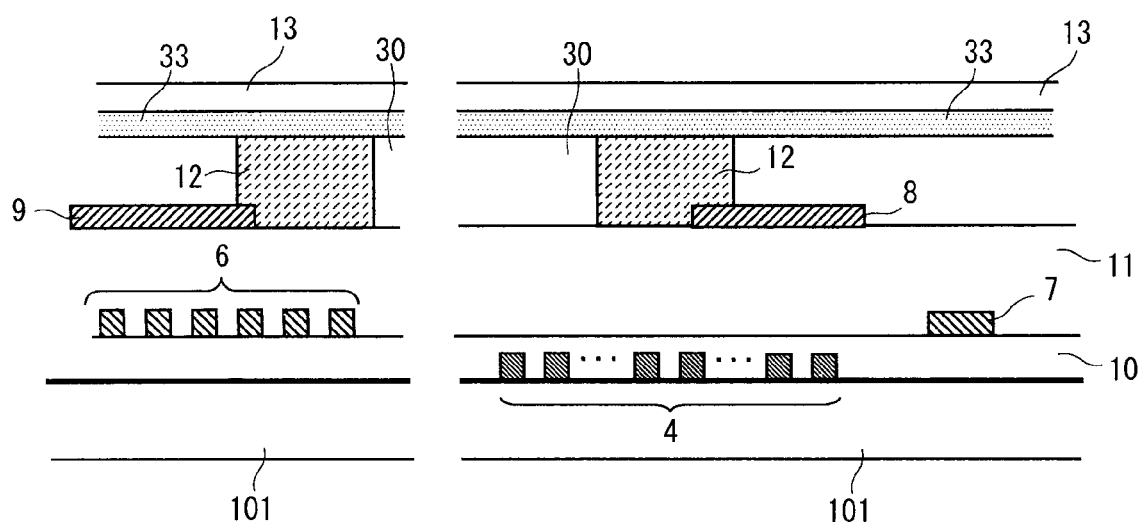
FIG. 11 is a sectional view taken along the line XI-XI of FIG. 10.

In this embodiment, a liquid crystal display device is described as an example of the display device similar to the first embodiment. Referring to FIGS. 10 and 11, the liquid crystal display device of this embodiment is described. FIG. 10 is a plan view of the structure of an end portion of the liquid crystal panel 1, and FIG. 11 is a sectional view taken along the line XI-XI of FIG. 10. Incidentally, the basic structure of the liquid crystal display device of this embodiment is the same as the first embodiment, so its description thereof is omitted. That is, first conductive layer 8 is formed to cover almost all of the scanning lead-out line 4 outside the sealing material 12.

In this embodiment, the pattern edge of the first conductive layer 8 is substantially aligned with the pattern edge of the sealing material 12. That is, the outer edge of the sealing material 12 is substantially aligned with the inner edge of the first conductive layer 8. Accordingly, the first conductive layer 8 does not extend up to the inner portion of the sealing material 12. Further, the first conductive layer 8 is not formed in almost all of the region just below the sealing material 12.

Incidentally, in the step of applying the sealing material 12, displacement of about 200 μm at the maximum is conceivable, so the sealing material 12 and the first conductive layer 8 are formed to overlap with each other to some extent as shown in FIG. 11 in consideration of variations in displacement. Needless to say, the first conductive layer 8 and the sealing material 12 may be formed not to overlap each other, and the first conductive layer 8 may be formed only outside the sealing material 12. In the above case as well, in a region opposite to the opposing electrode 33 outside the sealing material 12, the first conductive layer 8 covers almost all of the scanning lead-out line 4. Accordingly, it is possible to prevent corrosion reaction.

Further, according to the above structure, a pattern of the first conductive layer 8 is reduced. Accordingly, an overlap area between the first conductive layer 8 and the scanning lead-out line 4 is decreased. Thus, a probability of short-circuiting between the first conductive layer 8 and the scanning lead-out line 4 can be lowered. Thus, a yield determined in the initial test can be improved, and productivity can be improved. For example, continuity is checked after the step of filling a liquid crystal and sealing a filling port to improve the yield.

Further, in this embodiment, the sealing material 12 is preferably a material having barrier property. That is, as the sealing material 12, a waterproof material is used. In this case, it is possible to prevent water or liquid from infiltrating into the sealing material 12 from the outside of the liquid crystal panel 1. As described above, if a material resistant to such infiltration of water or the like is used as the sealing material 12, a corrosion reaction between the scanning lead-out line 4 and the opposing electrode 33 occurs in a region outside the sealing material 12 in many cases. Accordingly, even if the first conductive layer 8 is formed only outside the sealing material 12, deterioration of the display quality can be avoided.

As described above, a corrosion reaction tends to occur in a region opposite to the opposing electrode 33 and outside the pattern edge 12a of the sealing material 12. Accordingly, if the first conductive layer 8 is formed mainly on this region, the corrosion reaction can be practically prevented. Further, an overlap area between the first conductive layer 8 and the scanning lead-out line 4 can be reduced to lower a probability of short-circuiting. In addition, it is possible to prevent a wiring load from increasing due to an increase in capacitance and prevent a signal delay. Thus, a display quality can be improved.

Fifth Embodiment

Figure 12:
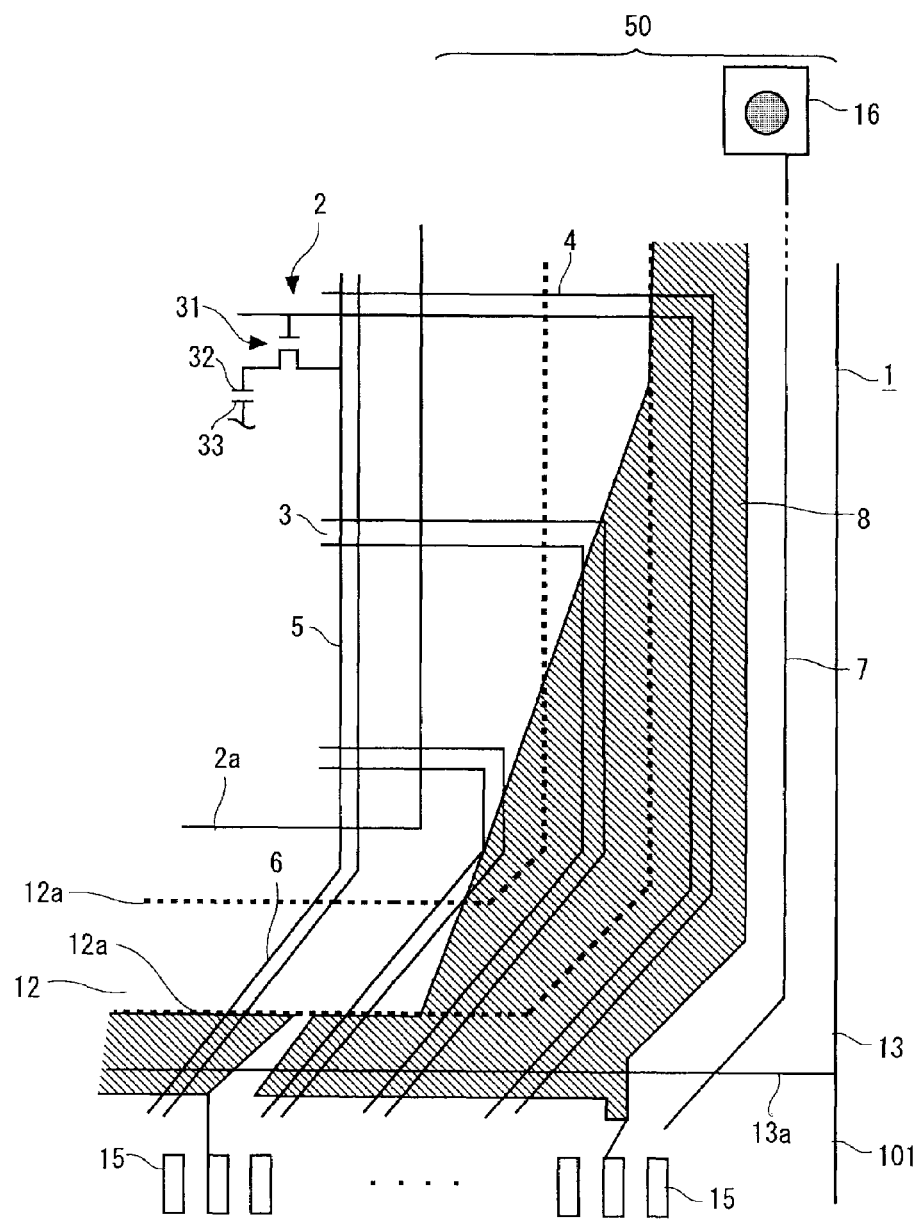
FIG. 12 is a plan view of the structure of an end portion of a liquid crystal panel of a liquid crystal display device according to a fifth embodiment of the present invention.

In this embodiment, a liquid crystal display device is described as an example of the display device similar to the first embodiment. Referring to FIG. 12, the liquid crystal display device of this embodiment is described. FIG. 12 is a plan view of the structure of an end portion of the liquid crystal panel 1. Incidentally, the basic structure of the liquid crystal display device of this embodiment is the same as the first embodiment, so its description thereof is omitted. That is, first conductive layer 8 is formed to cover almost all of the scanning lead-out line 4 outside the sealing material 12.

Further, in this embodiment, a pattern shape of the first conductive layer 8 is different from that of the fourth embodiment. More specifically, a pattern of the first conductive layer 8 is gradually changed such that an overlap area between the scanning lead-out line 4 and the first conductive layer 8 is changed stepwise in accordance with the arrangement order of the scanning lead-out lines 4. Here, an overlap area between the first conductive layer 8 and the scanning lead-out line 4 that is formed for the most part outside the sealing material 12 is large. On the other hand, an overlap area between the first conductive layer 8 and the scanning lead-out line 4 that is formed for the most part inside the sealing material 12 is small. Due to the difference in overlap area, a capacitance varies between the scanning lead-out lines 4. That is, the capacitance varies between the scanning lead-out line 4 due to the difference in overlap area, and the signal delay varies. For example, a capacitance is largely changed in the scanning lead-out line 4 that is formed for the most part outside the sealing material 12. On the other hand, a capacitance is hardly changed in the scanning lead-out line 4 that is formed for the most part inside the sealing material 12.

Here, if the adjacent scanning lead-out lines 4 differ in overlap area and largely differ in increase of a capacitance, a difference in signal delay might influence a displayed image. That is, if there is a large difference in signal delay between the adjacent scanning lead-out lines 4, the difference leads to a difference in pixel potential, which would be recognized as display unevenness. In such cases, the pattern shape of the first conductive layer 8 is gradually changed to gradually change the overlap area on the basis of the scanning lead-out line 4. Thus, a difference in signal delay between the adjacent scanning lead-out lines 4 can be reduced. As described above, according to this embodiment, an increase in capacitance of the scanning lead-out line 4 can be changed stepwise, so the signal delay is changed stepwise. As a result, the change can be suppressed down to a non-recognizable level on the display, and a display quality can be improved.

More specifically, the long scanning lead-out line 4 overlaps with the first conductive layer 8 only outside the sealing material 12. On the other hand, the short scanning lead-out line 4 overlaps with the first conductive layer 8 also inside the sealing material 12. Then, the remaining scanning lead-out lines 4 overlap with the first conductive layer 8 in a portion of the region just below the sealing material 12 and outside the sealing material. Accordingly, the pattern width of the first conductive layer 8 varies depending on a position in the vertical direction as shown in FIG. 12. A region including the first conductive layer 8 just below and inside the sealing material 12 is gradually reduced in accordance with the scanning lead-out line 4.

As described above, the overlap area between each scanning lead-out line 4 of scanning lead-out line 4 and first conductive layer 8 is gradually changed. For example, an overlap area just below and inside the sealing material 12 is decreased in the arrangement order of the scanning lead-out lines 4. That is, an overlap area between the scanning lead-out line 4 and the first conductive layer 8 is changed in accordance with the arrangement order of the scanning lead-out lines 4 just below and inside the sealing material 12. Thus, a load of the scanning lead-out line 4 is gradually changed. Accordingly, a difference in pixel electrode potential resulting from a difference in signal delay that accompanies the load change can be reduced down to a visible level or lower.

Sixth Embodiment

Figure 13:
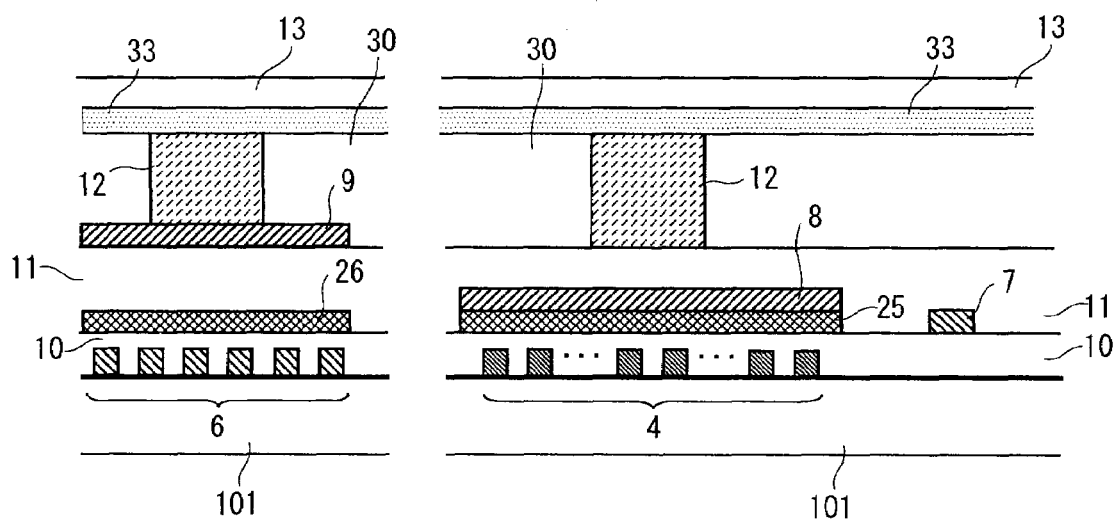
FIG. 13 is a sectional view of the structure of an end portion of a liquid crystal panel of the liquid crystal display device sixth embodiment of the present invention.

In this embodiment, a liquid crystal display device is described as an example of the display device similar to the first embodiment. Referring to FIG. 13, the liquid crystal display device of this embodiment is described. FIG. 13 is a sectional view of an end portion of the liquid crystal panel 1, that is, a sectional view taken along the line II-II of FIG. 1. Incidentally, the basic structure of the liquid crystal display device of this embodiment is the same as the first embodiment, so its description thereof is omitted. That is, the first conductive layer 8 is formed to cover almost all of the scanning lead-out line 4 outside the sealing material 12.

As shown in FIG. 13, in this embodiment, the scanning lead-out line 4 is covered with a fifth conductive layer 25 as well as the first conductive layer 8. The fifth conductive layer 25 has substantially the same shape as the first conductive layer 8. Then, the fifth conductive layer 25 is formed to overlap the first conductive layer 8 in a position closer to the scanning lead-out line 4 side than the first conductive layer 8.

Here, the fifth conductive layer 25 is formed in the same layer as the semiconductor layer of the TFT 31. Accordingly, the fifth conductive layer 25 is formed on the gate insulating film 10 covering the scanning lead-out line 4, and the first conductive layer 8 is formed thereon. That is, the semiconductor pattern (fifth conductive layer 25) is formed in the same layer as the semiconductor layer of the TFT 31 between the first conductive layer 8 and the gate insulating film 10.

Thus, the scanning lead-out line 4 is covered with the semiconductor pattern (fifth conductive layer 25) below the first conductive layer 8.

Further, in FIG. 13, the display lead-out line 6 is covered with the sixth conductive layer 26 as well as the second conductive layer 9. The sixth conductive layer 26 has substantially the same shape as the second conductive layer 9. Then, the sixth conductive layer 26 is formed to overlap with the second conductive layer 9 on the display lead-out line 6 side.

Here, the sixth conductive layer 26 is formed in the same layer as the semiconductor layer of the TFT 31. Therefore, the display lead-out line 6 is formed in the same layer as the scanning signal line 3, and a layer conversion portion is formed to connect the display lead-out lines 6 and the display signal lines 5. Thus, the display lead-out line 6 and the scanning lead-out line 6 are formed with the same conductive layer. Accordingly, the sixth conductive layer 26 is formed on the gate insulating film 10 covering the display lead-out line 6. Further, the second conductive layer 9 is stacked on the interlayer insulating film 11 covering the sixth conductive layer 26. That is, the semiconductor pattern (sixth conductive layer 26) is formed in the same layer as the semiconductor layer of the TFT 31, between the second conductive layer 9 and the gate insulating film 10. Hence, the display lead-out line 6 is covered with the semiconductor pattern (sixth conductive layer 26) below the second conductive layer 9.

Figure 14:
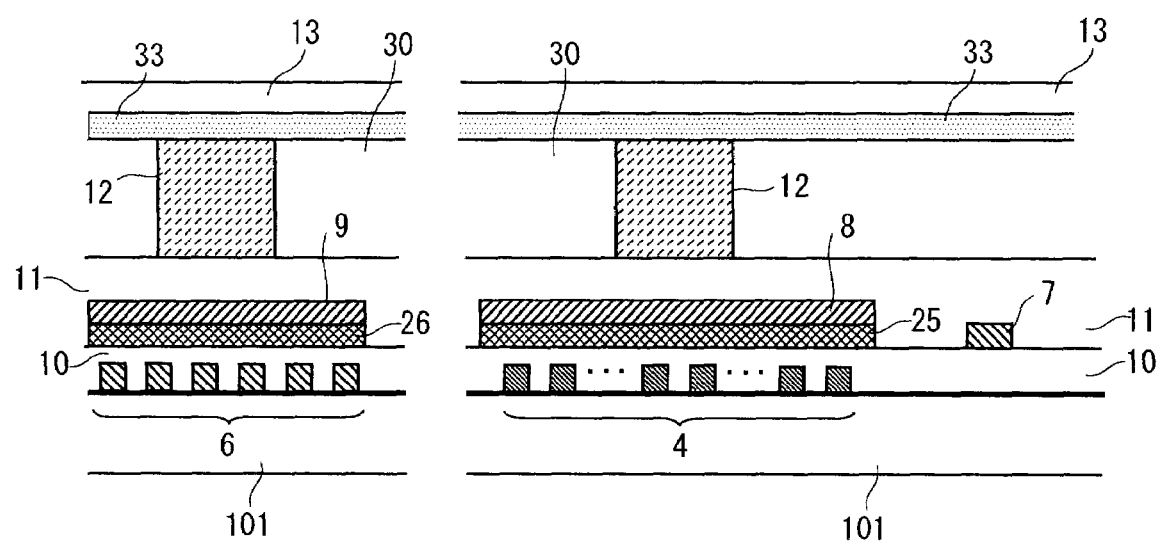
FIG. 14 is a sectional view of another structure of an end portion of the liquid crystal panel of the liquid crystal display device of the sixth embodiment.

Incidentally, in the above description, the second conductive layer 9 is positioned in the same layer as the pixel electrode 32, but may be positioned in the same layer as the display signal lines 5 as shown in FIG. 14. FIG. 14 is a sectional view of another structure of an end portion of the liquid crystal panel 1, that is, a sectional view taken along the line II-II of FIG. 1. In this case, the second conductive layer 9 is positioned in the same layer as the display signal lines 5 and the first conductive layer 8. Accordingly, a sixth conductive layer 26 is formed on the gate insulating film 10 covering the display lead-out line 6, and the second conductive layer 9 is layered thereon. The fifth and sixth conductive layers 25 and 26 are formed of, for example, amorphous silicon.

As described above, in this embodiment, the fifth conductive layer 25 formed using the same layer as the semiconductor layer is positioned between the first conductive layer 8 and the gate insulating film 10. That is, the scanning lead-out line 4 is covered with the fifth conductive layer 25 having a lower conductivity than the first conductive layer 8 below the first conductive layer 8. Thus, a probability that the first conductive layer 8 is short-circuited with the scanning lead-out line 4 can be decreased to improve a yield. For example, the continuity is checked after a step of filling a liquid crystal and sealing an filling port to thereby prevent a defective product from being transferred to the next manufacturing step, and productivity can be improved. Further, as for the display lead-out line 6, similar effects can be attained.

Incidentally, the sixth embodiment describes the first conductive layer 8 having the same pattern shape as that of the first embodiment by way of example, but the present invention is not limited thereto. For example, the conductive layer may have pattern shapes similar to those of the second to fifth embodiments, and the shapes may be combined as appropriate. Further, the first to sixth embodiments describe an example where the first conductive layer 8 is formed in almost the entire region where the scanning lead-out line 4 opposes the opposing electrode 33, but the present invention is not limited thereto. The first conductive layer 8 is formed in a portion of the region where the scanning lead-out line 4 opposes the opposing electrode 33, and all of the remaining region may be coated with a resin to prevent corrosion of the scanning lead-out line. A portion of the frame region 50 at the outer edge of the TFT array substrate 101 where the driving IC is mounted can be relatively easily coated with a resin. In this case, the first conductive layer 8 may be formed at the edges other than the edge where the driving IC is mounted, which cannot be easily coated with a resin. The above description is applicable to the display lead-out line 6.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display device, comprising:
   an array substrate including a pixel electrode;
   an opposing substrate provided opposite to the array substrate and including an opposing electrode;
   a sealing material applied around a display region and bonding the array substrate to the opposing substrate; and
   a display material filled in a space defined by the array substrate, the opposing substrate, and the sealing material,
   the array substrate being provided with:
   a plurality of scanning signal lines formed in the display region;
   a plurality of display signal lines formed in the display region to cross the plurality of scanning signal lines;
   a plurality of switching elements arranged in matrix in the display region and connected to the scanning signal lines and the display signal lines;
   a plurality of scanning lead-out lines arranged in a frame region formed outside the display region in accordance with the plurality of scanning signal lines;
   an insulating film formed on the plurality of scanning lead-out lines;
   a conductive layer formed on the insulating film and applied with a predetermined potential, wherein,
   the opposing electrode is formed outside the sealing material, and
   the conductive layer is formed to cover the plurality of scanning lead-out lines in a region facing towards the opposing electrode outside the sealing material.

2. The display device according to claim 1, further comprising:
   a repair pattern formed on a display region side of the conductive layer,
   wherein the repair pattern crosses each of the plurality of scanning lead-out lines.

3. The display device according to claim 1, wherein the conductive layer extends up to just below the sealing material, and
   an insulating film formed between the scanning lead-out line and the conductive layer has a larger thickness in a region just below the sealing material than in a region outside the sealing material in a region where the conductive layer is formed.

4. The display device according to claim 1, wherein the conductive layer extends up to an inner portion of the sealing material, and
   an overlap area between the scanning lead-out line and the conductive layer just below and inside the sealing material is changed in accordance with the arrangement order of the scanning lead-out lines.

5. The display device according to claim 1, wherein an outer edge of a pattern of the sealing material is substantially aligned with a pattern edge of the conductive layer.

6. The display device according to claim 1, wherein the predetermined potential applied to the conductive layer is a common potential applied to the opposing electrode.

7. The display device according to claim 1, wherein the predetermined potential applied to the conductive layer is substantially equal to an average value of a common potential applied to the opposing electrode.

8. The display device according to claim 1, wherein the predetermined potential applied to the conductive layer is substantially equal to a median potential of the display signal lines.

9. The display device according to claim 1, wherein the conductive layer is formed in the same layer as the display signal line or the pixel electrode.

10. The display device according to claim 1, wherein each switching element is a thin film transistor, and the conductive layer is formed in the same layer as a semiconductor layer of the thin film transistor.

11. The display device according to claim 1, wherein each switching element is a thin film transistor, and a pattern formed in the same layer as a semiconductor layer of the thin film transistor is provided between the conductive layer and the insulating film.

12. The display device according to claim 9, wherein each switching element is a thin film transistor, and a pattern formed in the same layer as a semiconductor layer of the thin film transistor is provided between the conductive layer and the insulating film.

* * * * *